United States Patent
Hartke et al.

(10) Patent No.: US 6,574,545 B2
(45) Date of Patent: Jun. 3, 2003

(54) CONTROL SYSTEM FOR AN INTERNAL COMBUSTION ENGINE WITH ELECTROMECHANICALLY ACTIVATED CHARGE CYCLE VALVES

(75) Inventors: Andreas Hartke, München (DE); Achim Koch, Tegernheim (DE); Thomas Vogt, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/033,239

(22) Filed: Oct. 22, 2001

(65) Prior Publication Data

US 2002/0069012 A1 Jun. 6, 2002

Related U.S. Application Data

(63) Continuation of application No. PCT/DE00/01204, filed on Apr. 17, 2000.

(30) Foreign Application Priority Data

Apr. 21, 1999 (DE) .......................................... 199 18 029

(51) Int. Cl.⁷ .......................... F02D 41/22; F02D 43/04; F02P 11/02
(52) U.S. Cl. ..................... 701/107; 123/630; 123/198 F
(58) Field of Search ................................. 701/107, 114; 123/41.31, 406.13, 479, 630, 198 F, 90.11

(56) References Cited

U.S. PATENT DOCUMENTS

| | | | | |
|---|---|---|---|---|
| 5,042,434 A | * | 8/1991 | Graf et al. | ................ 123/41.31 |
| 5,190,013 A | * | 3/1993 | Dozier | .................... 123/198 F |
| 5,201,296 A | | 4/1993 | Wunning et al. | ........... 123/479 |
| 5,890,078 A | | 3/1999 | Furuta | ............................ 701/1 |
| 6,401,684 B2 | * | 6/2002 | Hori et al. | ................ 123/198 F |

FOREIGN PATENT DOCUMENTS

| | | | |
|---|---|---|---|
| DE | 44 20 425 A 1 | 12/1995 | |
| DE | 297 12 502 U1 | 10/1997 | |
| DE | 197 23 563 A 1 | 12/1998 | |
| EP | 0 309 986 A1 | 4/1989 | |
| EP | 0 724 067 A1 | 7/1996 | |
| EP | 0 854 280 A1 | 7/1998 | |
| JP | 2001-164975 | * 6/2002 | ........... F02D/41/22 |

* cited by examiner

Primary Examiner—Andrew M. Dolinar
(74) Attorney, Agent, or Firm—Laurence A. Greenberg; Werner H. Stemer; Ralph E. Locher

(57) ABSTRACT

An internal combustion engine has an electromechanical valve train, in which the valve control device houses not only the output stage for the ignition system and the output stage for the fuel injection system. The valve control device can rapidly prevent the ignition of the air/fuel mixture in the cylinder affected by the valve failure of an electromechanically actuated valve. Moreover, all output stages important for the thermal combustion process are combined in one control device, which is advantageously connected to a water-cooling system.

11 Claims, 1 Drawing Sheet

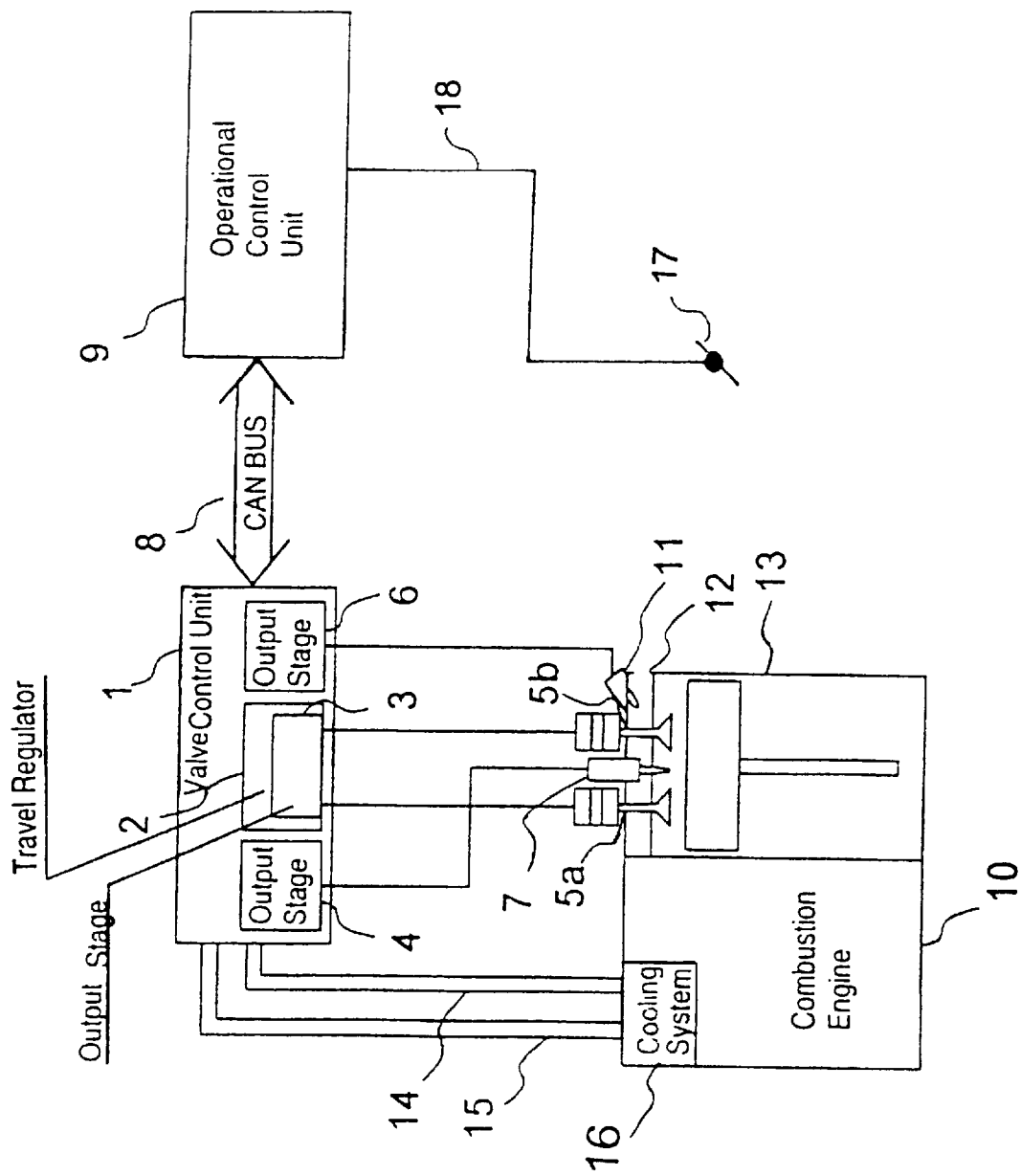

CONTROL SYSTEM FOR AN INTERNAL COMBUSTION ENGINE WITH ELECTROMECHANICALLY ACTIVATED CHARGE CYCLE VALVES

CROSS-REFERENCE TO RELATED APPLICATION

This application is a continuation of International Application No. PCT/DE00/01204, filed Apr. 17, 2000, which designated the United States.

BACKGROUND OF THE INVENTION

FIELD OF THE INVENTION

The invention relates to a control system for an internal combustion engine with at least one electromechanically activated charge cycle valve, an injection system and an ignition system, which are each operated by output stages.

Internal combustion engines whose charge cycle valves are electromechanically activated are known. In contrast to camshaft-activated valves, these valves are actuated, so as to open and close as a function of the rotational position of the crankshaft; there is no fixed mechanical coupling to the crankshaft. Electromechanical final controlling elements for charge cycle valves are known, for example, from German Utility Model DE 297 19 502 U1 (which corresponds to Eppich et al., U.S. Pat. No. 5,980,235) or European Patent Application EP 0 724 067 A1 (which corresponds to Sono et al., U.S. Pat. No. 5,752,478). They have a rest position that is located between a closed position and an open position, from which they can be deflected by electromagnets.

The respective winding is energized in order to open or close a valve. The necessary current is greater in the capture phase than in the holding phase, in which the valve is held in an end position.

Whereas the control times are not predefined in the operational control unit of the internal combustion engine in the case of a conventional, camshaft-activated valve drive, it is necessary to calculate and predefine appropriate control times in the case of electromechanically activated valves.

The injection system and ignition system of an internal combustion engine are usually each actuated by output stages that are disposed in the operational control unit of the internal combustion engine.

The operational control unit and the valve control unit communicate with one another, usually via a data bus, for example a CAN data bus.

In contrast to camshaft-activated valves, electromechanically activated valves can be opened and closed independently of the operation of the internal combustion engine. When the electromechanical activation of the valve fails, it is therefore possible for the respective valve to remain opened when it is not desirable. A valve may fail, for example, due to a failure of the actuating unit, of the output stage that actuates the actuating unit, or due to a fault in the valve control unit, which also occurs only for a brief time under certain circumstances.

Such a failure is detected by the valve control unit. However, the valve control unit cannot signal this in good time to the operational control unit via the CAN bus because generally data is only exchanged via this bus connection every 180° crankshaft angle.

If such a failure occurs at an inlet valve, ignition into the intake tract or the intake manifold may therefore occur, which can lead to damage to the intake tract, in particular if the latter is fabricated from plastic.

Furuta (U.S. Pat. No. 5,890,078) discloses a control system for an internal combustion engine in which, in addition to an operational control unit that has a processor, a control unit is provided that has a processor and exchanges data with the operational control unit via a bidirectional communications line. The additional control unit controls the activating elements for the ignition, injection, adjustment of throttle valve, and the shifting of an automatic transmission. If the additional control unit determines that a fault has occurred either in the operational control units or at the interface between the two control units, the additional control unit assumes the function of calculating the control variables in order to be able to control the activating elements independently of the operational control unit. This document is not concerned with the control of an internal combustion engine with electromechanically activated charge cycle valves.

European Patent Application EP 0 309 968 A1, which corresponds to Kashimura et al. U.S. Pat. No. 4,893,590, discloses an electronic control unit for use in a motor vehicle. The electronic control unit is disposed in the vicinity of the internal combustion engine and is thermally connected to the cooling circuit of the internal combustion engine in order to avoid overheating.

SUMMARY OF THE INVENTION

It is accordingly an object of the invention to provide a control system for an internal combustion engine with electromechanically activated charge cycle valves that overcomes the hereinafore-mentioned disadvantages of the heretofore-known devices of this general type and that has at least one electromechanically activated charge cycle valve that prevents undesired ignition of a fuel/air mixture even when the electromagnetic actuating charge cycle valve fails.

With the foregoing and other objects in view, there is provided, in accordance with the invention, a control system for an internal combustion engine having an electromechanically activated charge cycle valve, an injection system, and an ignition system, each with respective output stages. The control system includes a bi-directional communications line, an operational control unit, and a valve control unit. The operational control unit for the internal combustion engine connects to the bi-directional communications line and has a processor determining pre-specified values for activating the injection system and the charge cycle valve. The valve control unit has a processor exchanging data with the operational control unit via the bi-directional communications line. The valve control unit contains the output stages for the ignition system as well as for the electromechanically activated charge cycle valve. The valve control unit actuates the output stages for the electromechanically activated charge cycle valve as a function of the data received from the operational control unit for detecting a failure of an electromechanically activated charge cycle valve leading to the charge cycle valve not being closed in the cylinder of the internal combustion engine and interrupting the ignition in the affected cylinder by suitably actuating the output stage of the ignition system in order to prevent ignition of the fuel/air mixture in the affected cylinder.

In order to be able to prevent the ignition of a fuel/air mixture when an electromechanically activated charge cycle valve fails, the output stage of the ignition system is integrated into the valve control unit. As a result, when a valve failure is detected, the valve control unit can promptly prevent the ignition because time-consuming communication via a bus to the operational control unit of the internal combustion engine is no longer necessary.

The ignition can be shut off for all the cylinders, but is also possible on a cylinder-specific basis.

All the output stages for the injection system, valve activation and ignition system are advantageously disposed in the valve control unit so that the operational control unit is free of output stages relating to the latter. As a result, the thermal connection or accommodation on the internal combustion engine is significantly simplified. Furthermore, the combination of all the output stages in the valve control unit provides the advantage that the water cooling which is desirable in any case for the output stages of the electromechanical valve activation and which can be brought about by the connection to the coolant circuit of the internal combustion engine improves the thermal conditions in the other output stages.

The operational control unit now only requests a desired torque or a desired load of the internal combustion engine from the valve control unit in which all the output stages are combined. Hence, the valve control unit is then a torque control unit that selects the ignition time, injection time, emission feedback rate, and valve opening times independently and sets them correspondingly at the output stages.

Other features that are considered as characteristic for the invention are set forth in the appended claims.

Although the invention is illustrated and described herein as embodied in a control system for an internal combustion engine with electromechanically activated charge cycle valves, it is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a partially diagrammatic and partially block view of an internal combustion engine with an operational control unit and a valve control unit.

DESCRIPTION OF THE PREFERRED EMBODIMENTS

Referring now to the single FIGUGE of the drawing, there is seen an internal combustion engine 10 with an operational control unit 9 and a valve control unit 1. The operational control unit 9 and valve control unit 1 are connected to one another via a CAN bus 8. The valve control unit 1 contains an output stage 4 for the ignition system 7, of which only a spark plug is illustrated diagrammatically in the FIGURE. In addition, the valve control unit 1 contains an output stage 6 for the injection system 11, of which only one injection valve is illustrated schematically in the figure. Finally, the valve control unit 1 also contains a travel regulator 2 with an output stage 3 for the electromechanically activated charge cycle valve 5a, 5b. Each cylinder 13 of the internal combustion engine has an intake tract 12.

The valve control unit 1 is connected via a feed 14 and a return 15 to the cooling circuit 16 of the internal combustion engine 10.

The operational control unit 9 communicates a torque or load request to the valve control unit 1 via the CAN bus 8.

The operational control unit 9 determines the request from an accelerator pedal (not illustrated) and from further characteristic variables.

The communication via the CAN bus is carried out every 180° crankshaft angle.

The valve control unit 1, to which a signal relating to the crankshaft position is additionally fed, calculates the ignition time, the injection time and the valve opening times as a function of the data fed by the operational control unit 9 via the CAN bus. This data also permits the emission feedback to be set if the outer valve is opened at least during a time period of the intake tract.

The valve control unit suitably actuates the output stages 2, 3, 4, and 6 so that the ignition system 7, the injection system 11 and the electromechanically activated charge cycle valves are correspondingly activated.

When the valve control unit 1 determines a failure of a charge cycle valve, either the inlet valve 5a or the outlet valve 5b, it can correspondingly actuate the output stage 4 so that the ignition does not occur in the affected cylinder 13. It is also alternatively possible to appropriately actuate the output stage 6 of the injection system 11 in order to prevent the generation of a combustion fuel/air mixture in the cylinder 13. These two measures make it possible to ensure that ignition does not occur in the intake tract 12 of the affected cylinder 13 if, for example, the inlet valve 5a has failed.

By virtue of the fact that all the output stages are combined in the valve control unit 1, the latter can interrupt the injection or emission very quickly, more quickly than would be possible if the valve control unit 1 had to signal this interruption to the operational control unit 9 via the CAN bus 8.

For example, the ignition can be interrupted up to 5 ms before the ignition time without the risk of damaging the ignition coil or the associated output stage.

As a result of the connection to the coolant circuit via the feed 14 and the return 15, the output stages 2, 3, 4, 6 in the valve control unit 1 are cooled much better than they would be in the operational control unit 9 without water cooling.

Instead of transmitting only a desired torque or a desired load of the internal combustion engine 10 to the valve control unit 1 from the operational control unit 9 via the CAN bus 8, the operational control unit 9 can, of course, also transmit the ignition angle, injection time and valve control time for each cylinder to the valve control unit, which then appropriately actuates the output stages 4, 2, 3, and 6.

The combination of the output stages for ignition, injection and electromechanical valve activation unites all the output stages, which are relevant for the thermal combustion process in one device.

The operational control unit 9 has only one way of intervening with a throttle valve 17, which is connected to the operational control unit 9 by a connecting line 18. This serves, as it were, as an "emergency off" switch because the operational control unit 9 can throttle the internal combustion engine 10 by intervening on the throttle valve 17, if, for some reason, the load control is not performed correctly by the valve control unit 1 via the inlet valves 5a.

We claim:

1. A control system for an internal combustion engine having cylinders, an electromechanically activated charge cycle valve, an injection system, and an ignition system, each with respective output stages, the control system comprising:

a bi-directional communications line;

an operational control unit for the internal combustion engine connected to said bi-directional communications line and having a processor determining pre-specified values for activating the injection system and the charge cycle valve; and a valve control unit having a processor exchanging data with said operational control unit via said bi-directional communications line, and containing the output stages for the ignition system as well as for the electromechanically activated charge cycle valve, said valve control unit actuating the output stages for the electromechanically activated charge cycle valve as a function of the data received from said operational control unit, for detecting a failure of an electromechanically activated charge cycle valve leading to the charge cycle valve not being closed in an affected one of the cylinders of the internal combustion engine and interrupting the ignition in the affected one of the cylinders by suitably actuating the output stage of the ignition system in order to prevent ignition of the fuel/air mixture in the affected one of the cylinders.

2. The control system according to claim 1, wherein:

said valve control unit includes every output stage of the ignition system and of the charge cycle valve, and said operational control unit is free of the output stages.

3. The control system according to claim 1, wherein said valve control unit is thermally connected to a cooling circuit of the combustion engine.

4. The control system according to claim 3, wherein said valve control unit is connected to the cooling circuit of the internal combustion engine via a feed and a return.

5. The control system according to claim 2, wherein:

said operational control unit requests a desired torque for the internal combustion engine from said valve control unit via said communications line; and said valve control unit determines correctional parameters of the injection system of the ignition system and sets the correctional parameters at the output stages.

6. The control system according to claim 5, wherein said valve control unit also determines the correctional parameters of the opening times of the charge cycle valve and sets the correction parameters at the output stages.

7. The control system according to claim 2, wherein:

said operational control unit requests a desired torque for the internal combustion engine from said valve control unit via said communications line; and said valve control unit determines the correctional parameters of the opening times of the charge cycle valve and sets the correction parameters at the output stages.

8. The control system according to claim 2, wherein:

said operational control unit requests a desired load for the internal combustion engine from said valve control unit via said communications line; and said valve control unit determines correctional parameters of the injection system and of the ignition system and sets the correctional parameters at the output stages.

9. The control system according to claim 8, wherein said valve control unit also determines the correctional parameters of the opening times of the charge cycle valve and sets the correction parameters at the output stages.

10. The control system according to claim 2, wherein:

said operational control unit requests a desired load for the internal combustion engine from said valve control unit via said communications line; and said valve control unit determines correctional parameters of the opening times of the charge cycle valve and sets the correctional parameters at the output stages.

11. The control system according to claim 1, including a connecting line for load throttling connecting said operational control to a throttle valve.

* * * * *